3,737,546
USE OF IPRONIDAZOLE IN COMBATTING SWINE DYSENTERY
Robert Earl Messersmith, Trenton, and Raffaele Amici Roncalli, Glen Ridge, N.J., assignors to Hoffmann-La Roche Inc., Nutley, N.J.
No Drawing. Filed Sept. 15, 1972, Ser. No. 289,398
Int. Cl. A61k 27/00
U.S. Cl. 424—273                 6 Claims

ABSTRACT OF THE DISCLOSURE

The use of ipronidazole and its water-soluble pharmaceutically acceptable acid addition salts in the oral and the parenteral treatment and prevention of swine dysentery is described.

DETAILED DESCRIPTION OF THE INVENTION

This invention is directed to the use of ipronidazole and its water-soluble pharmaceutically acceptable acid addition salts in the treatment and prevention of swine dysentery. Ipronidazole is a known compound which chemically is 1-methyl-2-isopropyl-5-nitroimidazole. The preparation of this compound and its water soluble acid addition salts are set out in U.S. Pat. 3,634,446 which issued Jan. 11, 1972. In said patent, the compound is disclosed as possessing antiprotozoal and antihistomonal activity, particularly the latter. The compound is described as being especially active in the treatment of the histomonal infection known as turkey blackhead disease or enterohepatitis. It has now been found that ipronidazole unexpectedly possesses outstanding activity in both the prevention and treatment of swine dysentery.

It has further been found in accordance with the present invention that ipronidazole quite unexpectedly possesses superior activity in the treatment of swine dysentery via parenteral administration. This latter discovery is considered quite unexpected as parenteral administration is considered to be a novel approach to therapeutic treatment of the disease.

Swine dysentery is one of the most common swine diseases diagnosed in the United States. Additionally, the disease is prevalent in many other countries and annually causes many thousands of dollars losses in stock to swine growers around the world. It has recently been discovered that a large spirochete is the causative organism of the disease. This organism, *Treponema hyodysenteriae*, has now been isolated and shown to be capable of producing the disease [Harris, D. L. et al.: Swine Dysentery-1 Inoculation of Pigs With *Treponema hyodysenteriae* (New Species) and Reproduction of the Disease, Vet. Med/SAC 67: 61–64: 1972]. The test data recited hereinafter concerns tests conducted with this organism. It must be noted that it is not known whether *T. hyodysenteriae* is the sole causative organism of swine dysentery. From the data available, however, it can be concluded that it is a primary source of the infection.

According to the present invention it has been discovered that ipronidazole possesses unexpected high activity in effecting both a cure and prophylaxis against swine dysentery when administered to swine in the diet, i.e. drinking water and feed. In addition, it has been found that ipronidazole is unexpectedly effective in the therapeutic treatment of swine dysentery by parenteral administration, a novel approach to treatment of the disease.

Ipronidazole and its pharmaceutically acceptable acid addition salts have been found to prevent and effect a complete cure of swine dysentery when administered to provide the active compound at levels as low as 0.005 percent by weight of the feed ration or drinking water.

For effective control of swine dysentery, ipronidazole can be administered at levels of from about 0.005% by weight to about 0.022% by weight preferably at about 0.011% by weight of the diet. In the therapeutic situation it is preferred to administer ipronidazole in the form of a soluble salt, preferably the hydrochloride, in the drinking water. The reason it is preferred to treat pigs infected with swine dysentery via the drinking water is that, generally, feed consumption declines appreciably in the early stages of the disease whereas water consumption does not. For therapeutic purposes, pigs infected with swine dysentery are given ad libitum drinking water containing a sufficient amount of a water-soluble, pharmaceutically acceptable acid addition salt of ipronidazole to provide from about 0.005% by weight to about 0.02% ipronidazole free base. The preferred concentration will depend to some extent on the severity of the infection. Additionally, the method of the invention encompasses the therapeutic treatment of swine dysentery via parenteral administration of ipronidazole as will be described hereinafter.

For prophylaxis, it is preferred in accordance with the present invention to administer ipronidazole in the feed ration. Therefore, the preferred method of prophylaxis comprises administering to pigs ad libitum a ration containing from about 0.02% by weight to about 0.005% by weight ipronidazole free base.

The water soluble, pharmaceutically acceptable acid addition salts of ipronidazole as contemplated herein include salts with both organic and inorganic acids which are soluble in water. Preferred salts are the hydrochloride and the bisulfate. For admixture to swine drinking water such salts can be utilized in pure powder form or can be admixed with water-soluble excipients, e.g. sugars, such as lactose, dextrose and the like and food acids such as, tartaric acid, citric acid and the like. Such formulations can be compounded to facilitate the addition of the proper amount of ipronidazole salt, i.e. from about 250 mg. to about 1000 mg., preferably 500 mg. per gallon, to the drinking water supply and can contain from about one to about ninety nine percent by weight of the water soluble salt of ipronidazole.

In those instances in accordance with the invention where ipronidazole is to be administered to swine in the form of an intimate admixture with a commercial dry feed or ration, a premix or feed supplement is likewise contemplated. Such a premix can advantageously contain from about 1% by weight to about 99% by weight ipronidazole free base. Additionally, such a premix or feed supplement can contain inert carriers or diluents such as, for example, corn meal, germ meal or other cereals, soybean flour, seed meal oyster shell flour, calcium silicate and the like and may additionally contain compatible medicaments. A suitable premix can likewise be prepared simply by adding the desired concentration of ipronidazole free base to a measured quantity of any commercial swine feed. A preferred premix is comprised of a mixture of cereal meals. Such a premix can be added to commercial feed and intimately mixed therewith to effect uniform distribution thereby assuring an effective concentration level of ipronidazole. The feed supplement or premix containing ipronidazole can be readily mixed with swine ration by any conventional technique for mixing feeds. For convenience in commercial use, it has been found that premixes containing from about 1 percent by weight to about 79 percent by weight ipronidazole are preferred with a premix containing 11 percent by weight being most preferred.

Where parenteral therapy with ipronidazole is used, a single dosage of from about 100 mg. to about 2200 mg., preferably about 1000 mg. is contemplated for the market weight pig. This represents from about 1 mg. to about 22 mg. preferably about 11 mg. ipronidazole per kilogram of body weight. It has been demonstrated that pigs with swine dysentery show a truly unexpected response to parenteral therapy with ipronidazole, i.e. complete remission within 24 hours. In such pigs, however, if symptoms recur, a second injection may be required at from 2 to 5 days. Continued treatment with either therapeutic or prophylactic levels of ipronidazole is therefore recommended. For example, if a few pigs in a herd show symptoms of the disease and are treated parenterally, the entire herd would then be placed on a propylaxis diet. On the other hand, if parenteral therapy is used to save several very sick pigs wherein the disease is evident throughout the herd, all pigs should be placed on therapeutic levels of ipronidazole. Such decisions are within the discretion of the attending veterinarian.

Parenteral solutions which are suitable for use in this invention are preferably of an aqueous nature due to the ability of the compound to form water-soluble acid addition salts. Such preparations may be in a reconstitutable powder form and may contain adjunct materials conventional in the art of pharmaceutical compounding such as, for example, preservatives, stabilizers, salts for varying osmotic pressure, buffers and the like. Typical parenteral preparations contain a sufficient amount of a water-soluble acid addition salt of ipronidazole to provide from about 100 mg. to about 2200 mg., preferably 1000 mg. of ipronidazole free base per dose. Such preparations may be in single or multiple dose containers.

The following examples illustrate the invention.

EXAMPLE 1

The following example illustrates typical feed supplement formulations suitable for the method of the invention.

Ipronidazole 12½% premix

| Ingredient: | Grams/kilogram |
|---|---|
| Ipronidazole | 125 |
| Microcel E (calcium silicate) | 50 |
| Pulverized oyster shell flour | 825 |
| Total weight | 1000 |

Procedure

The pulverized oyster shell flour was placed in a suitable mixer and, while mixing, the Microcel E was slowly added and thoroughly mixed. The ipronidazole was then slowly added with continued mixing until the mixture was homogeneous.

This premix was then added to commercial swine ration at the rate of 1¾ lb./ton to yield a concentration of about 100 gm./ton. The commercial feeds to which this premix is added may be free of other medicaments or may contain other medicaments if the final mixture is compatible therewith.

Ipronidazole 22% premix

| Ingredient: | Grams/kilogram |
|---|---|
| Ipronidazole | 220 |
| Microcel E (calcium silicate) | 80 |
| Soy oil | 10–50 |
| Soy meal run (toasted, extracted, milled soy) | 650–690 |

Ipronidazole 11% premix

| Ingredient: | Grams/kilogram |
|---|---|
| Ipronidazole | 110 |
| Microcel E | 40 |
| Soy oil | 10–100 |
| Ground rice hulls | 750–840 |

Procedure

A portion of the soy meal run (or ground rice hulls) was placed in a suitable mixer and about 10 grams (1% by weight of final mixture) of the soy oil and the Microcel E slowly added thereto and the whole thoroughly mixed. As the purpose of the oil is to minimize dust, additional oil may be added during this mixing process as needed to maintain the mixture in a slightly moist condition. The ipronidazole was then added thereto and the whole thoroughly mixed until homogeneous. The required amount of additional grain was then added to bring the final weight to one kilogram and the mixture again mixed until homogeneous.

These premixes were then combined with commercial feed formulations at the rate of 2 pounds per ton to yield final levels of ipronidazole of 100 gm./ton and 200 gm./ton, respectively.

Ipronidazole hydrochloride water-soluble powder formulation

| Ingredient: | Amount in grams |
|---|---|
| Ipronidazole HCl | 50 |
| Lactose | 177 |

The ingredients were blended in a suitable powder to form a homogeneous powder. One-half pound of this powder added to 100 gallons of drinking water provides a solution containing 0.013% by weight of ipronidazole hydrochloride, equivalent to 0.0106% by weight ipronidazole free base. The drinking water can also contain other medicaments, nutrients and adjuvants which may be added separately or combined with the powder in dry form.

EXAMPLE 2

Inoculum for 14 pigs to be designated as carrier pigs was obtained as follows. An original inoculum isolated from an outbreak of swine dysentery in Iowa and passed once in isolation units in pigs from a disease controlled herd was utilized to inoculate four pigs in isolation from the disease controlled herd. Three of these pigs exhibiting mucohemorrhagic enteritis typical of swine dysentery were sacrificed. Intestinal scrapings of the colon and caecum were collected and diluted 1:1 in PBS, i.e. phosphate buffer solution. A sample of this material was found to be free of *Salmonella sp.* and to contain large numbers of the large spirochete *T. hyodysenteriae* which was isolated in pure culture.

Within 4 hours of collection the buffered suspension of intestinal scrapings was used to inoculate 14 pigs designated hereinafter as carrier pigs with 20 cc. per os. Eight days after inoculation, the carrier pigs were freely intermingled with a group of 96 experimental pigs. Beginning on the following day, the carrier pigs began to develop a mucoid enteritis typical of swine dysentery which progressed to mucohemorrhagic dysentery.

Procedure A: prophylaxis

Eight days after exposure, one-half of the experimental pigs were place in 12 pens, each pen holding 4 pigs. One of the carrier pigs, all of which had enteritis, was placed in each pen for additional exposure. As soon as the pigs were placed in the pens, the below-listed rations were fed ad libitum for 28 days after which non-medicated basal ration was fed 10 days to all pigs and the experiment was terminated. Each day, the number of pigs with enteritis and hemorrhagic enteritis was noted. Pigs which died were autopsied and the presence of *T. hyodysenteriae* and *Salmonella sp.* noted.

| Group | No. of pigs | Feed | Gm. ipronidazole/ton |
|---|---|---|---|
| A | 12 | Basal | [1] None |
| B | 12 | do | 50 |
| C | 12 | do | 100 |
| D | 12 | do | 200 |

[1] Control.

RESULTS

| Group | Losses | Pig scour days [b] | | Total | Average pig weight (lb.) | | |
|---|---|---|---|---|---|---|---|
| | | Day 1-14 | Day 14-28 | | Initial | Survivors Day 14 | Day 28 |
| A (12 pigs) | [a] 9 | 130/68 | 139/119 | 269/187 | 44.3 | 47.1 | 48.9 |
| B (12 pigs) | 2 | 86/16 | 40/14 | 126/30 | 44.1 | 59.9 | 83.8 |
| C (12 pigs) | 0 | 28/0 | 14/0 | 42/0 | 44.2 | 61.6 | 84.6 |
| D (12 pigs) | 0 | 53/0 | 31/0 | [c] 84/0 | 44.2 | 61.7 | 82.9 |

[a] Includes 5 dead, 4 culls destroyed after 28 days.
[b] First figure is days pigs were observed to have enteritis, second number is pig days with bloody enteritis and includes dead pig days.
[c] The somewhat a typical enteritis of the pigs fed feed containing 200 gm. ipronidazole/ton is felt to be related to the drug as the enteritis was akin to a "post-weaning" enteritis as there was not mucous or blood in the feces.

The results above clearly indicate that the feeding of a feed formulation containing 100 to 200 gm. per ton ipronidazole is highly efficacious in the prevention of swine dysentery and a feed containing 50 gm. per ton is efficacious in the majority of cases.

Procedure A: prophylaxis

Following the preceding test, the carrier pigs were remingled with the remaining 48 experimental pigs. As some of the experimental pigs had dysentery at this time, 16 were selected and penned by weight and severity of symptoms to form replicate one of this trial. A second replicate was commenced in 4 days again using the 16 sickest pigs and the final replicate begun three days later utilizing the twelve sickest pigs and the 4 sickest carrier pigs, one carrier pig being assigned to each pen.

The pigs were fed drinking water ad libitum containing the below listed amounts of ipronidazole for seven days. Plain water was then fed for 10 additional days and the experiment was terminated. Once again, dead pigs were autopsied and daily observations were made for pigs with enteritis and hemorrhagic enteritis.

| Group | No. of pigs | Mg. ipronidazole hydrochloride per gallon drinking water |
|---|---|---|
| A | 12 | [1] 0 |
| B | 12 | 250 |
| C | 12 | 500 |
| D | 12 | 1,000 |

[1] Control.

mucohemorrhagic enteritis was given 5 cc. of a 5% aqueous solution of ipronidazole hydrochloride i.p. The following day the pig showed no signs of enteritis. After seven days, this pig, which had relapsed, and five others were treated in the same manner. Five of these pigs, including the released pig had had mucohemorrhagic enteritis for at least 2 days and the remaining pig for one day. Remission was observed in all pigs within 24 hours. One of the pigs relapsed in 3 days and was given a second injection. Again, remission of symptoms was observed within 24 hours. One week after the last mentioned injection, the two pigs which had relapsed were sacrificed, and autopsied. Although each pig was free of clinical symptoms of the disease, the caecum and colon of both were edematous with considerable ascites and inflammed with mucoid debris in the colon. No fibrin was present on any organs of the abdominal cavity of either pig. These conditions indicate that, although a single injection of ipronidazole in the contemplated dosages causes a dramatic regression of clinical symptoms of swine dysentery, follow up therapy as by feeding either prophylactic or therapeutic levels of the drug to pigs ad libitum for three or four days post injection may be required to effect a complete cure in all instances.

EXAMPLE 3

A total of 6.04 grams of parenteral grade ipronidazole hydrochloride, equivalent to 5.0 grams of free base, was filled into an ampul utilizing a Diehl Meter electric filler or other suitable type filler. The ampuls were sealed and sterilized at 255° F. for 2 hours. Immediately before use this powder is solubilized with Water for Injection U.S.P. q.s. 50 ml.

RESULTS

| Group | Losses [a] | Pig scour days [b] | | Total pig scour days | Average weight | |
|---|---|---|---|---|---|---|
| | | Medicated period day 1-7 | Unmedicated period day 8-17 | | Initial | Survivors 17 days |
| A (12 pigs) | 7 | 70/47 | 102/79 | 172/126 | 44.9 | 55 |
| B (12 pigs) | 0 | 9/5 | 14/2 | 23/7 | 45.5 | 66.0 |
| C (12 pigs) | 0 | 11/3 | 14/2 | 25/5 | 45.2 | 66.2 |
| D (12 pigs) | 0 | 18/3 | 7/0 | 25/3 | 45.3 | 67.0 |

[a] Includes 6 dead and one cull which had to be destroyed after 17 days.
[b] First number is days pigs were observed to have enteritis, second number is pig days with bloody enteritis and includes dead pig days.

In the foregoing experiment marked improvement was evidenced in all medicated groups within 24-48 hours and no evidence of hemorrhagic enterisis was found in any of the medicated pigs after 72 hours. In each of groups B and C one pig developed a relapse of mucohemorrhagic enteritis in 8 days after withdrawal. The superior efficacy of ipronidazole in the therapeutic treatment of swine dystentery is evidenced by the above test wherein no losses were experienced and the number of scour days was reduced 85% over the control.

Procedure C: parenteral therapy

Eight carrier pigs and three culls not utilized for the preceding experiments were isolated, weighed and given unmedicated feed and water ad libitum. One pig with

What is claimed is:

1. A method for the prevention of swine dysentery which comprises orally administering ad libitum to swine susceptible to swine dysentery a ration containing from about 0.005% by weight to about 0.02% by weight ipronidazole.

2. The method according to claim 1 wherein said ration contains about 0.01% by weight ipronidazole.

3. A method for the therapeutic treatment of swine dysentery which comprises orally administering to pigs afflicted therewith ad libitum drinking water containing a sufficient amount of pharmaceutically acceptable water-soluble acid addition salt of ipronidazole producing from about 0.005% to about 0.02% by weight of ipronidazole free base.

4. The method according to claim 3 wherein said drinking water contains a sufficient amount of said salt to provide about 0.01% by weight of ipronidazole free base.

5. The method according to claim 3 wherein said pharmaceutically acceptable salt of ipronidazole is the hydrochloride.

6. A method for the therapeutic treatment of swine dystentery which comprises parenterally administering to a pig afflicted therewith a composition containing from about 1.0 mg. to about 22.0 mg. of ipronidazole or a pharmaceutically acceptable water-soluble acid addition salt thereof per kilogram of body weight of said pig.

References Cited

Hoffmann-La Roche, Chem. Abst., vol. 69 (1968), p. 106705y.

SAM ROSEN, Primary Examiner